April 7, 1953 J. B. PARSONS 2,633,871
ELECTROMAGNETIC CONTROL VALVE DEVICE FOR
FLUID PRESSURE SYSTEMS OR THE LIKE
Filed Aug. 2, 1949 2 SHEETS—SHEET 1
FIG. 1.
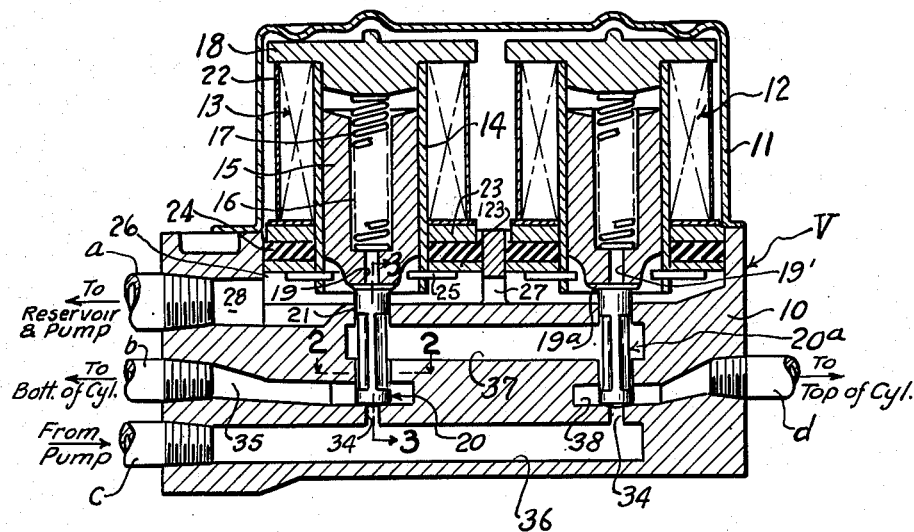
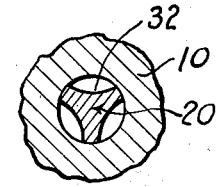
FIG. 2.
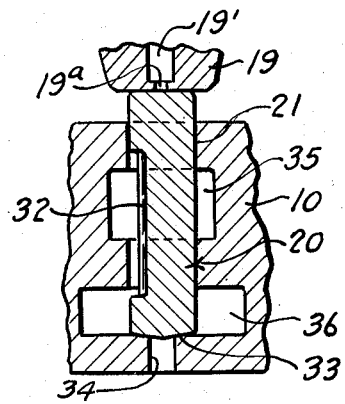
FIG. 3.
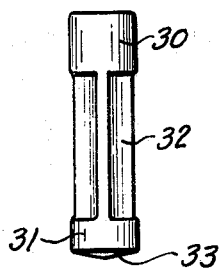
FIG. 3A.
INVENTOR.
John B. Parsons
BY
ATTORNEY

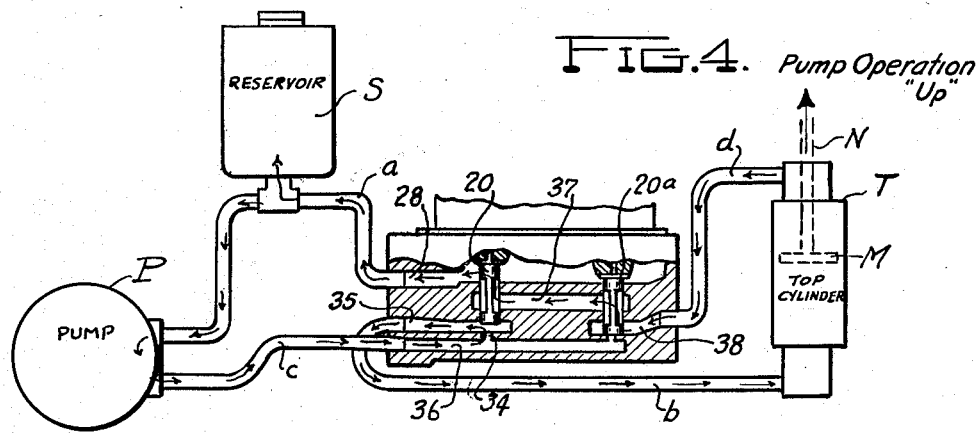
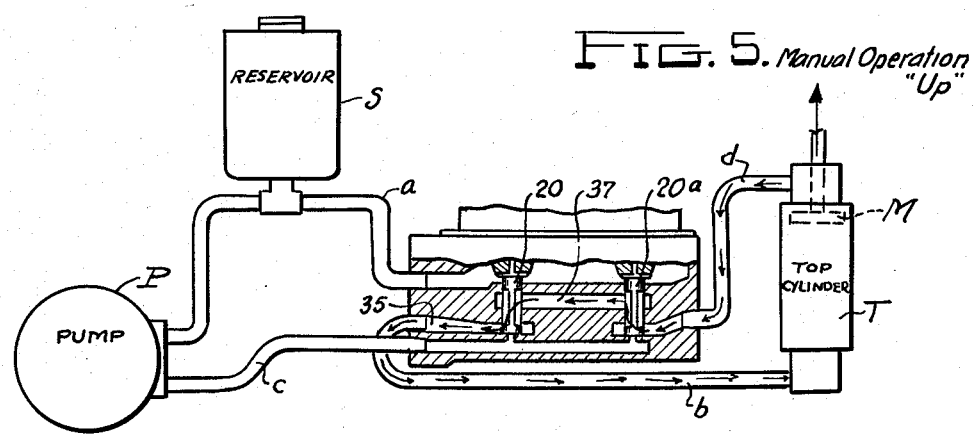
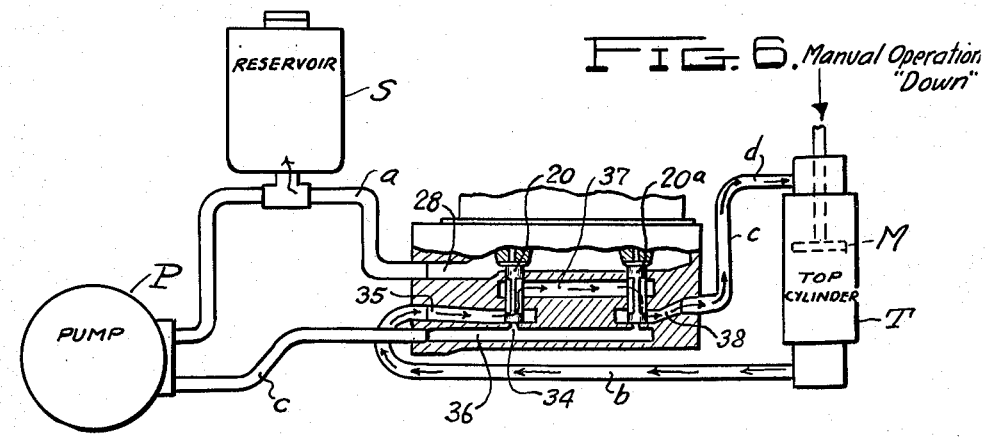

Patented Apr. 7, 1953

2,633,871

UNITED STATES PATENT OFFICE 2,633,871

ELECTROMAGNETIC CONTROL VALVE DEVICE FOR FLUID PRESSURE SYSTEMS OR THE LIKE

John B. Parsons, Maumee, Ohio

Application August 2, 1949, Serial No. 108,197

3 Claims. (Cl. 137—623)

This invention relates to regulator devices such, for example, as actuating mechanism for vehicles for moving a part between two positions of adjustment such as the movement, for example, of a convertible top to and from its position of use, and an object is to produce a new and improved mechanism of this type which is fluid-actuated and electrically controlled and is so designed as to enable it to be manually operated if desired.

Another object is to produce a hydro-electric regulator system by which power means is employed for selectively reciprocating a member automatically but is so constructed and arranged that the same movement may be manually achieved without making any change or adjustment in the system.

A further object is to produce a regulator mechanism which can advantageously be used to operate vehicle tops and employing fluid under pressure and electrically controlled valves so that by the simple manipulation of a switch, the top may be raised or lowered as desired, provision being made, however, to enable manual operation of the top in either direction, should such exigency arise.

Other objects and advantages of the invention will hereinafter appear, and for purposes of illustration but not of limitation, an embodiment of the invention is shown on the accompanying drawings, in which Figure 1 is a vertical sectional elevation of a double solenoid controlled valve assembly which is operative to control the direction of flow of the liquid under pressure and which is designed also to afford relatively free circulation of the liquid in one direction or the other in the event that the piston and cylinder assembly which is connected to operate the vehicle part, is manually operated;

Figure 2 is a transverse sectional view substantially on the line 2—2 of Figure 1;

Figure 3 is a vertical sectional view substantially on the line 3—3 of Figure 1;

Figure 3A is a side elevation of one of the control valves;

Figure 4 is a schematic view partly in section of the vehicle top operating mechanism showing by arrows the direction of liquid flow in which the top operating piston is moved upwardly by power means thereby to move the vehicle top to its raised or closed position;

Figure 5 is a diagrammatic view similar to Figure 4 but showing by arrows the direction of liquid flow when the top is being moved manually to its raised or closed position; and Figure 6 is a view similar to Figures 4 and 5, but showing by arrows the liquid flow when the top is moved to its open or folded position manually.

The illustrated embodiment of the invention as shown on Figures 1 to 3A comprises a double solenoid controlled valve device V which comprises a housing 10 on the upper portion of which is suitably mounted a sheet metal cover 11. Arranged within the cover 11 in laterally spaced relation is a pair of solenoids 12 and 13. Each solenoid has a centrally disposed vertical sleeve 14 in which a cylindrical slide 15 is reciprocable. Each slide 15 has an axial socket 16 open at its upper end, and disposed therein is a helically coiled spring 17, the upper end of which abuts against a plug 18 fitting the sleeve 14 and covering the outer end of the solenoid. The lower end of each spring 17 abuts against the bottom of the socket 16 to urge the respective slide downwardly or outwardly relative to its solenoid. On the lower end of each slide 15 is a nose 19 which has a flat end to abut against the upper end of a piston valve 20 or 20a. The nose 19 of each slide 15 has an axial vent 19' intersecting a lateral vent groove 19a, thereby to vent the inside of the slide during its reciprocatory movements. Each piston valve is reciprocable within a cylindrical bore or socket 21 within the housing 10 in axial alignment with and directly beneath the respective slide 15.

Surrounding each solenoid sleeve 14 are windings 22 which are disposed between the flange of the plug 18 and a washer 23 surrounding the sleeve. Spaced beneath the washer 23 is a washer 123 which is retained in position by pins 25 passing transversely through the walls of the metallic sleeve 14. Intermediate the washers 23 and 123 is a rubber ring 24 which has sealing engagement with the outside walls of the sleeve 14 and with the walls of a cylindrical cavity 26 in the housing 10. The lower portions of the cavities 26 are in communication by a port 27 and as shown on Figure 1, a relatively short passage 28 leads from the adjacent cavity 26 to the outside of the housing 10 and communicates with a tube a connected to the housing. As will hereinafter more fully appear, the passage 28, the lower ends of the cavities 26, and the port 27, constitute a return or relief fluid passage enabling fluid to pass to the inlet side of the pump or to the reservoir.

Each piston valve is provided with cylindrical end portions 30 and 31 and intermediate these end portions are arcuately shaped grooves 32, in this instance three of such grooves being provided by radially extending flanges or lands, the ends of which slidably engage the walls of the socket 21. The cylindrical end portions 30 and 31 likewise have a sliding fit with the walls of the socket 21. The lower end of each valve 20 adjacent the cylindrical portion 31 is substantially cone-shaped as indicated at 33, forming a valve end to seat against the upper end of a vertically disposed port 34 which connects a horizontal work passage with a horizontal inlet passage 36. The left-hand valve on the drawing (Figure 1) is designated 20 and the right-hand valve, which is identical with the left-hand valve, is referred to by the reference number 20a.

A work passage 35 is associated with the lower end of the valve 20 and opens to the outside of the housing 10, a tube b being connected thereto. The inner end of the inlet passage 36 is closed but the outer end opens to the outside of the housing 10 and receives a tube c which is connected thereto. Spaced above the horizontal passage 35 is a horizontal connecting passage 37 which affords communication between intermediate portions of the valves 20 and 20a. Intermediate the horizontal passages 36 and 37 in the region of the valve 20a is a horizontal work passage 38 similar to the passage 35, and to the outer end of the passage 38 is connected a tube d.

In the normal position of each of the valves 20 and 20a, the lower conical end 33 closes the vertical port 34 and the upper cylindrical portion 30 seals the connecting passage 37 from the passage 28 thereabove. The lands providing the grooves 32 in the normal position of the valves enable relatively free communication between the work passages 35 and 38 and the connecting passage 37. Thus in the normal position of each valve, the lower end portions of the grooves 32 are open to the respective work passage 35.

Referring to Figures 4 to 6, it will be noted that the tube a leads to the inlet side of a pump P and interposed is a liquid reservoir S. The pump P is preferably driven by an electric motor (not shown). It will also be apparent that the tube c leads to the discharge or pressure side of the pump P. The tube b leads to the lower end of a cylinder T within which is a reciprocable piston M having a piston rod N. The piston rod N may connect, for example, to the linkage of the folding top of an automobile as will be readily understood by those skilled in this art, the arrangement being such that upon upward movement of the piston rod, the top will be moved from its folded position to its raised or unfolded position. On the other hand, downward movement of the piston N operates to move the top from its raised position or position of use to its lowered or folded position. The tube d extends to the upper end of the cylinder T.

It will be further understood that a suitable switch (not shown) will be employed for controlling each of the solenoids individually and mounted in any suitable remote location, such, for example, as on the instrument board of the automobile body or on the door adjacent the driver's seat. It will be also understood that current for energizing the solenoids will be supplied from the usual storage battery. Upon energizing one or the other of the solenoids, the respective slide 15 is moved upwardly compressing the respective coil spring 17 and thereby freeing the associated piston valve 20 or 20a.

In operation, assuming it is desired to drive the piston M upwardly in the cylinder T (Figure 4), the pump P is energized and concomitantly the solenoid above the valve 20 is energized thereby to cause the slide 15 to move upwardly and compress the coil spring 17. The liquid from the discharge end of the pump passes through the tube c and into the passage 36 in the housing 10. The liquid pressure in the port 34 forces the piston valve 20 upwardly allowing the liquid to pass into the passage 35 to the tube b which leads to the lower end of the cylinder T, thereby to impose hydraulic pressure on the underside of the piston M to force it upwardly within the cylinder. Liquid above the piston M is forced from the cylinder T through the tube d and into the passage 38. Since the piston valve 20a is held in its normal position closing the vertical port 34, the liquid passes upwardly past the piston and into the passage 37. From the passage 37 the liquid flows past the valve 20 which has been elevated as shown in Figure 4, and since it can not flow downwardly past the piston valve since the latter has closed the lower portion of the socket 21, the liquid flows upwardly to the horizontal passage 28 to the tube a and thence to the inlet side of the pump P.

Manifestly, by placing the pump P in operation and energizing the solenoid above the valve 20a, the liquid is directed to the top of the cylinder T to drive the piston M downwardly and the liquid in the bottom portion of the cylinder T is forced therefrom past the valve 20 to the inlet side of the pump P through the tube a. Detail description of this operation is not considered necessary because the same will be apparent in view of the above description.

The system above described is useful not only in the actuation of convertible tops for automobiles, but for window regulator mechanisms, seat adjusters and the like. However, it is particularly useful in connection with the power operation of convertible tops not only because of the ease by which the top may be raised or lowered automatically, but also because it makes possible manual operation of the top. At certain times, it may be necessary manually to operate the top, for example, in the event that the battery current is low or because of pump failure or other reasons. Ordinarily, such manual operation is extremely difficult, if not impossible, in a hydraulic system because of the trapping of the liquid which provides a positive block to the piston movement. The flow of liquid in response to the manual operation of the top is diagrammatically illustrated in Figures 5 and 6. Figure 5 shows the liquid flow when the top is manually raised. In such instance, the upward movement of the piston M causes the liquid above the piston to pass through the tube d and upwardly past the valve 20a which is held in its normal or closed position, thence horizontally through the passage 37 and downwardly past the closed valve 20 to the passage 35. From the passage 35, the liquid passes through the tube b to the lower end of the cylinder T. Thus without too great manual effort, the top may be moved to its raised or closed position. Although there is some resistance to such movement, due to the force of the liquid from one side of the piston to the other, the flow is relatively free. It will be observed that the upward movement of the piston creates a greater space for liquid on the underside of the piston due to the fact that less liquid can be contained in the space above the piston because of the space taken up by the piston rod.

Thus the upward movement or unfolding of the convertible top is relatively simple due to the comparatively free flow of liquid from one side of the piston to the other and the fact that there is greater space within the cylinder for the liquid below the piston than above it. This situation does not obtain when the top is lowered manually because the forcing of the liquid from beneath the piston M into the cylinder above the piston results in there being excess liquid for which there is insufficient space in the cylinder above the piston due to the presence of the piston rod, as above mentioned. This is compensated for automatically because when the pressure created above the piston M is sufficient to overcome the pressure exerted by the coil spring 17 above the slide 15 against the piston valve 20, then the piston valve 20 is forced upwardly a sufficient distance to enable liquid to pass upwardly into the passage 28 from whence it may pass through the tube $a$ to the reservoir S. This, of course, may also take place when the piston M is moved upwardly if it creates such a liquid pressure as to unseat or move the valve 20a upwardly, such excess pressure being relieved by allowing liquid to pass to the reservoir S as above explained.

In the above description, mention has been made that in the event the fluid pressure on either of the valve units 20 and 20a is sufficient to overcome the respective spring 17, then fluid may pass to the tube A and thence to the reservoir S. It should be understood, however, that any upward movement of the valves immediately uncovers the respective vertical port 34 and in case that the pump P is not operating, instead of liquid passing to the reservoir S through the tube A, it may pass down through the port 34 to the passage 36 and thence through the tube C to the pump P. In case the pump P is a gear pump or one enabling fluid flow from the pressure to the inlet side, it will be manifest that then fluid may find its way to the reservoir S by passage in this reverse direction. Pumps of that character are well-known to be of such type as permit fluid flow from the pressure to the inlet side when they are idle. It is thus to be understood that in the event of excess pressure, the fluid may find its way to the reservoir S either through the tube A from the upper portion of one or the other of the valves or through the tube C, pump P and a portion of the tube A to the reservoir S.

Although the embodiment of the invention has been described for use in automobiles, it is to be understood that it has usefulness in a variety of fields where it is desired to control the movement of a part. It will also be understood that although the description has been with respect to a hydraulic system, the same can be operated to advantage with other fluids such as air under pressure.

It is to be understood that numerous changes in details of construction, arrangement and operation may be effected without departing from the spirit of the invention especially as defined in the appended claims.

What I claim is:

1. A device of the type described comprising a body having a laterally spaced pair of valve chambers; said chambers having corresponding first and second opposite end portions and first and second axially spaced intermediate ports; said body having input and exhaust passages therein respectively adjacent said first and second end portions and adapted for connection with the supply and return pipes of a source of fluid; input and exhaust ports respectively connecting the first and second end portions of each of said valve chambers with said input and exhaust passages; common passage means connecting the second intermediate ports of said valve chambers; said body having a first work passage connected to the first intermediate port of one of said chambers and a second work passage connected to the first intermediate port of other of said chambers; spool valves in said chambers, each of said valves having enlarged ends disposed adjacent the ends of the chambers adapted to close said inlet and exhaust ports and relieved shanks therebetween, said shanks being spaced from the surrounding walls of their respective chambers so that fluid may pass therebetween, said valves being movable between a first axial position in which the enlarged ends thereof close said input and exhaust ports while a bypass is established between said work passages through said intermediate ports, chambers and common passage means, and a second axial position in which said input and exhaust ports are open and in which the adjacent one of said enlarged ends blocks the chamber between the intermediate ports thereby to block said bypass while opening a fluid connection between the input passage and the associated work passage, the opposite end enlargement of each of said valves in the second position thereof being remote from that portion of the chamber between said second intermediate port and the exhaust port so as to allow fluid to flow out therebetween; spring means engaged between said body and said valves for biasing the same to one of said axial positions; and electromagnetic means for selectively overcoming the bias of said spring means whereby said valves may be moved by fluid pressure to the other of said axial positions.

2. A device of the type described comprising a body having a laterally spaced pair of valve chambers; said chambers having corresponding first and second opposite end portions and first and second axially spaced intermediate ports; said body having input and exhaust passages therein respectively adjacent said first and second end portions and adapted for connection with the supply and return pipes of a source of fluid; input and exhaust ports respectively connecting the first and second end portions of each of said valve chambers with said input and exhaust passages; common passage means connecting the second intermediate ports of said valve chambers, said body having a first work passage connected to the first intermediate port of one of said chambers and a second work passage connected to the first intermediate port of other of said chambers, spool valves in said chambers, each of said valves having enlarged ends disposed adjacent the ends of the chambers adapted to close said inlet and exhaust ports and relieved shanks therebetween; said shanks being spaced from the surrounding walls of their respective chambers so that fluid may pass therebetween, said valves being moveable between a first axial position in which the enlarged ends thereof close said input and exhaust ports while a bypass is established between said work passages through said intermediate ports, chambers and common passage means, and a second axial position in which said input and exhaust ports are open and in which the adjacent one of said enlarged ends blocks the chamber between the intermediate ports thereby to block said bypass while opening a fluid connection between the input passage and the associated work passage, the opposite end enlargement of each of said valves in the second position thereof being remote from that portion of the chamber between said second intermediate port and the exhaust port so as to allow fluid to flow out therebetween, a pair of slides respectively supported in said body adjacent the second ends of said chambers; said slides being moveable in the direction of axial movement of said valves and being engageable with the valves for movement therewith; springs respectively engaged between said body and slides and normally biasing the same to move from the second axial position to the first; and selectively energizable electro-magnetic means in said valve for opposing said spring bias, whereby said valves may selectively be opened by fluid pressure in said inlet ports.

3. A device of the type described comprising a body having a laterally spaced pair of valve chambers; said chambers having corresponding first and second opposite ends and first and second axially spaced intermediate ports; said body having input and exhaust passages therein respectively adjacent said first and second ends and adapted for connection with the supply and return pipes of a source of fluid; input ports extending axially from said first ends and respectively connecting the valve chambers with said input passages; exhaust ports in the sides of said chambers adjacent the second ends thereof and connecting the same with said exhaust passage, common passage means connecting the second intermediate ports of said valve chambers; said body having a first work passage connected to the first intermediate port of one of said chambers and a second work passage connected to the first intermediate port of other of said chambers; spool valves in said chambers, each of said valves having enlarged cylindrical ends disposed adjacent the ends of the chambers adapted to close said inlet and exhaust ports and relieved shanks therebetween said shanks being spaced from the surrounding walls of their respective chambers so that fluid may pass therebetween, said valves being moveable between a first axial position in which the enlarged ends thereof close said input and exhaust ports while a bypass is established between said work passages through said intermediate ports and common passage means, and a second axial position in which said input and exhaust ports are open and in which the adjacent one of said enlarged ends blocks the chamber between the intermediate ports thereby to block said bypass while opening a fluid connection between the input passage and the associated work passage, the opposite end enlargement of each of said valves in the second position thereof lying beyond and uncovering the associated exhaust port so as to allow fluid to exhaust therefrom; a pair of valve actuators respectively supported in said body adjacent the second ends of said chambers; said actuators drivingly engaging said valves respectively so as to move the same axially in said chambers, springs engaged between said body and actuators whereby the latter tend normally to move the valves to their first axial position; said actuators constituting solenoid armatures; and a pair of selectively energizable solenoid windings respectively associated with said actuators and arranged, upon energization thereof, to overcome the spring bias.

JOHN B. PARSONS.

REFERENCES CITED

The following references are of record in the file of this patent:

UNITED STATES PATENTS

| Number | Name | Date |
|--------|------|------|
| 978,579 | Grebel | Dec. 13, 1910 |
| 2,215,115 | Buffington | Sept. 17, 1940 |
| 2,339,353 | Ray | Jan. 18, 1944 |
| 2,392,421 | Stephens | Jan. 8, 1946 |
| 2,477,669 | Stephens | Aug. 2, 1949 |